United States Patent [19]
Fox

[11] 3,867,046
[45] Feb. 18, 1975

[54] ROPE FITTING

[75] Inventor: Cyril Fox, Clayworth, near Doncaster, England

[73] Assignee: British Ropes Limited, Doncaster, Yorkshire, England

[22] Filed: Sept. 24, 1973

[21] Appl. No.: 400,031

[30] Foreign Application Priority Data
Oct. 20, 1972  Great Britain.................... 48483/72

[52] U.S. Cl............................. 403/210, 24/115 K
[51] Int. Cl............................................ F16g 11/14
[58] Field of Search........ 24/115 K, 115 J; 403/209, 403/210; 248/61; 254/192; 294/78

[56] References Cited
UNITED STATES PATENTS

| | | | |
|---|---|---|---|
| 1,875,139 | 8/1932 | Pounder............................ | 24/115 R |
| 1,912,244 | 5/1933 | Bacot................................ | 24/115 R |
| 1,976,371 | 10/1934 | Pritchett.......................... | 24/115 K |
| 2,364,628 | 12/1944 | Garlinghouse................... | 24/115 K |
| 2,715,008 | 8/1955 | Huber............................... | 24/115 J |
| 2,801,895 | 8/1957 | Gass.................................. | 403/381 |

FOREIGN PATENTS OR APPLICATIONS

| | | | |
|---|---|---|---|
| 1,026,628 | 4/1966 | Great Britain................... | 24/115 K |
| 259,227 | 11/1910 | Germany.......................... | 24/115 K |

Primary Examiner—Bernard A. Gelak
Attorney, Agent, or Firm—Johnson, Dienner, Emrich & Wagner

[57] ABSTRACT

A load bearing member, having an arcuate groove of rounded cross-section adapted to receive the crown of an eye formed at the end of a rope, is mounted between a pair of spaced walls facing one another. The arcuate groove runs generally parallel to the walls.

6 Claims, 16 Drawing Figures

PATENTED FEB 18 1975

ROPE FITTING

This invention relates to rope fittings.

It is current practice when forming an eye at the end of a rope — irrespective of the material from which the rope is made, but especially if it is synthetic and of large diameter — to insert that part of the rope which is to become the eye through a tubular thimble before completing the splice, to afford protection during service. However, this procedure is only partially successful in that, whilst it affords the desired protection, passage of the rope through the thimble is difficult and frequently time consuming, even when the tubular thimble incorporates cut away areas around its circumference to facilitate such manipulation. In addition, it is not possible to ensure that all the inner surfaces of the thimble are sufficiently smooth. A thimble adds considerably to the weight of the eye and is of limited value once the splice has been completed. Such a thimbled eye having been formed, it is attached to a chain, monkey face, or other such fitment, by means of a shackle which, of necessity, requires a jaw gap capable of accepting at least the thimble diameter. Furthermore, to accommodate the larger ropes of high tensile strength and sustain the relative working forces, it is necessary to reinforce the tubular thimble at the points of shackle contact. Large diameter wire ropes may be formed round a thimble having a reinforcement between its legs to withstand the imposed crushing forces of such high tensile strength ropes. There are numerous situations where large diameter ropes need terminating as described above. Also, in most instances, during removal or installation, they have to be wound on or off a drum, which operation tends to disturb the thimble and eventually to detach it from the eye, to the detriment of the efficient working of the rope and its life.

The present invention is directed to the circumvention or suppression of these undesirable features, and to the promotion of beneficial features whereby a device can be constructed which, in a single unit, embodies the essential components to afford the requisite load bearing, protection and rapid positive attachment of large diameter ropes which terminate in an eye splice.

Accordingly, the invention provides a rope fitting comprising a pair of spaced walls facing one another, and a load bearing member mounted between the walls, the load bearing member having an arcuate groove of rounded cross-section adapted to receive the crown of an eye formed at the end of a rope, the arcuate groove running generally parallel to the walls.

The walls can conveniently be extended away from the groove to constitute attachment means; the extensions may merge into each other to enhance the rigidity of the fitting. Preferably the load bearing member has a generally semi-circular profile when viewed from one wall towards the other. It is particularly convenient for the load bearing member to be connected to at least one wall by a tongue and groove.

In a preferred embodiment, the load-bearing member is a separate element which is located and suitably secured between a pair of semi-circular suspension plates, the central vertical axes of which are parallel and diametrically opposed to one another. Each suspension plate is elongated (away from the groove) into an arm or lug where the central vertical axis intersects the periphery, at which point an attachment hole is drilled through the face.

The invention will be described further, by way of example only, with reference to the accompanying drawings, in which.

The fitting illustrated in FIGS. 1 to 5 includes a load-bearing member 1 referred to hereinafter as a saddle. The saddle 1 is a metal plate, of greater height than thickness and greater length than height, with parallel side walls. The profile of the saddle 1 in elevation (FIG. 2) is basically a semi-circle 3 merging with a flat base 4 at right angles to its axis of symmetry. This profile may be modified according to requirements, e.g. to save weight of metal (exemplified by the hatched area 6).

The saddle has an arcuate peripheral groove 7 of rounded cross-section to accept the crown of an eye splice and afford a bearing surface for it, and is supported between two suspension plates 8, 9. These are disposed parallel to the side walls of the saddle and to each other, and both have the basic side elevation shown in FIG 2. Each comprises a semi-circular plate elongated at the central part to form an arm 10 or 11. Opposed holes 12, 13 are drilled through the respective arms 10, 11.

Figure 1:
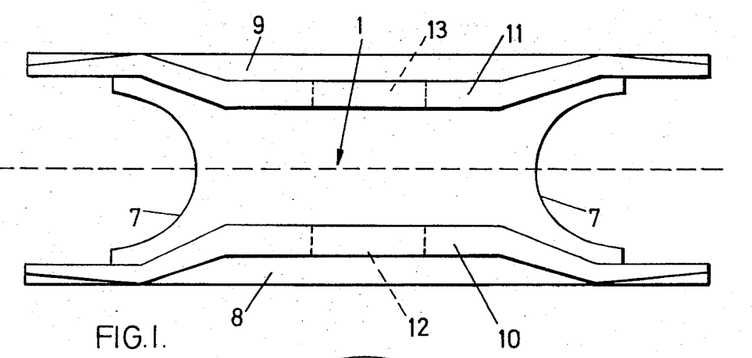
FIG. 1 is a plan view of a rope fitting.
Figure 2:
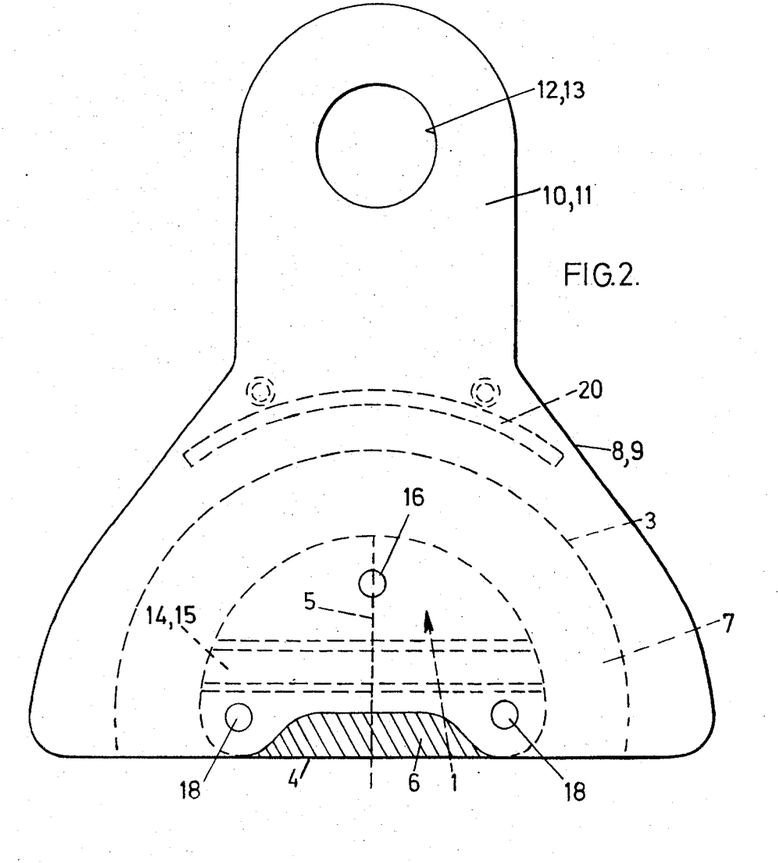
FIG. 2 is a side elevation of the fitting of FIG. 1.
Figure 3:
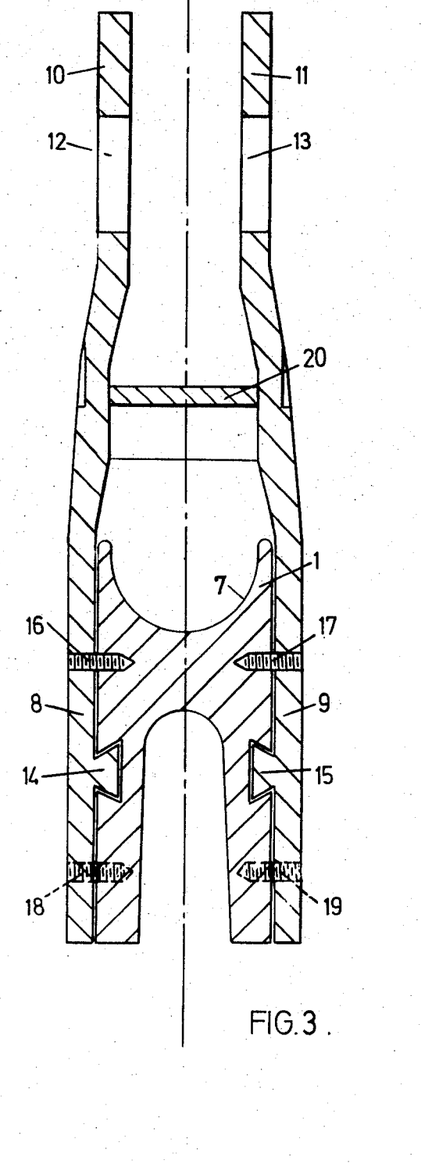
FIG. 3 is a cross-section of the fitting of FIG. 2.
Figure 4:
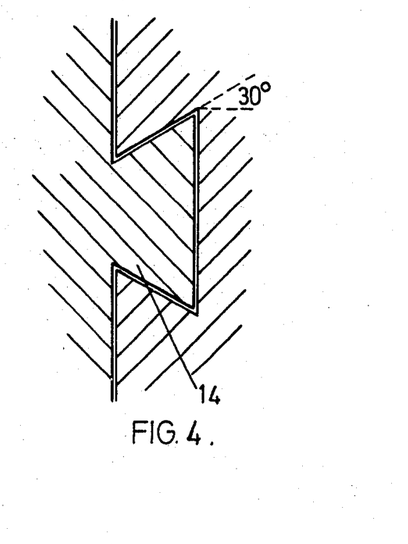
FIG. 4 is an enlarged detail of FIG. 3 showing the way in which the suspension plates are positively located on the saddle.
Figure 5:
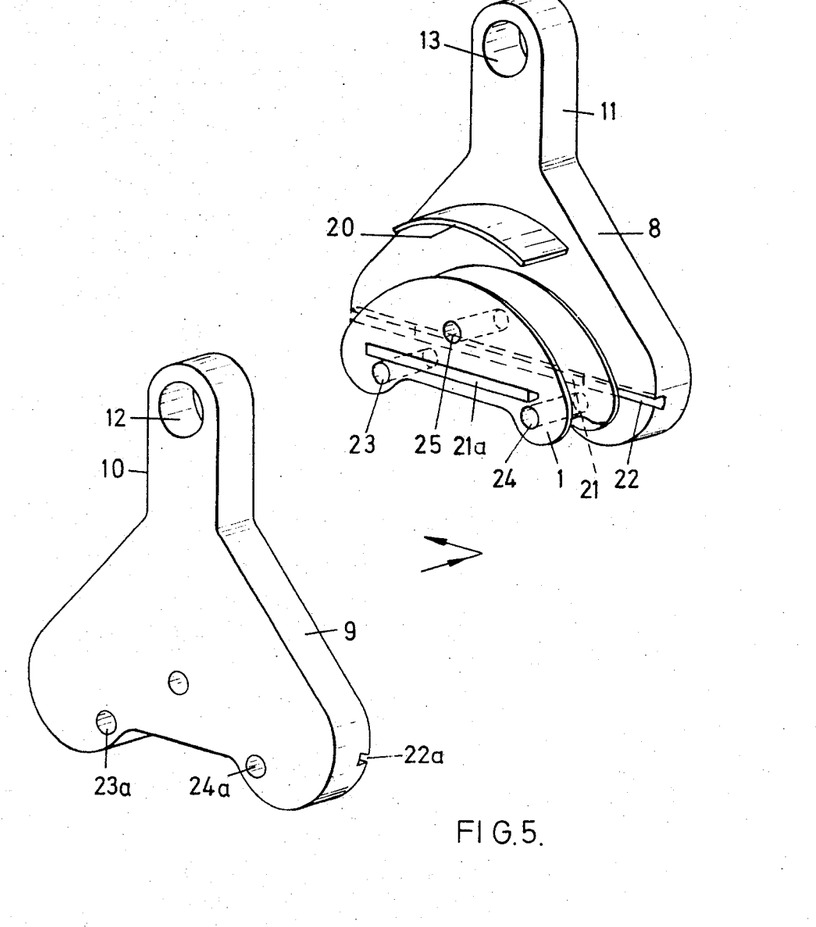
FIG. 5 is an exploded isometric view of a similar fitting to demonstrate the manner of assembly.
Figure 6:
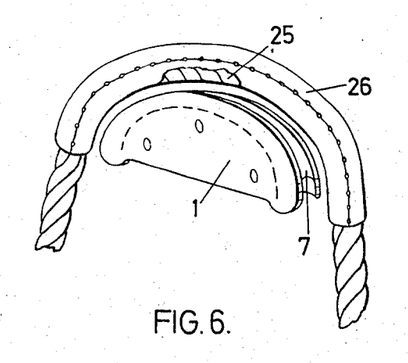
FIG. 6 is an isometric view of a saddle and a thimbled rope, and illustrates the initial forming of a soft eye around the saddle.
Figure 7:
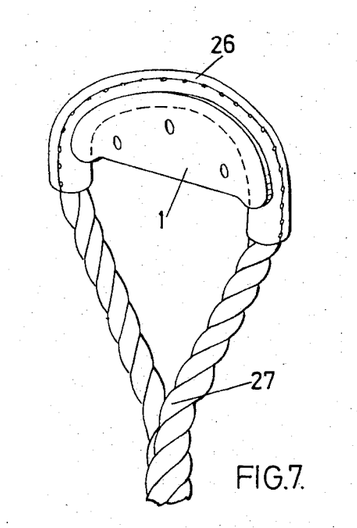
FIG. 7 is a view similar to FIG. 6, showing the completed eye splice.
Figure 8:
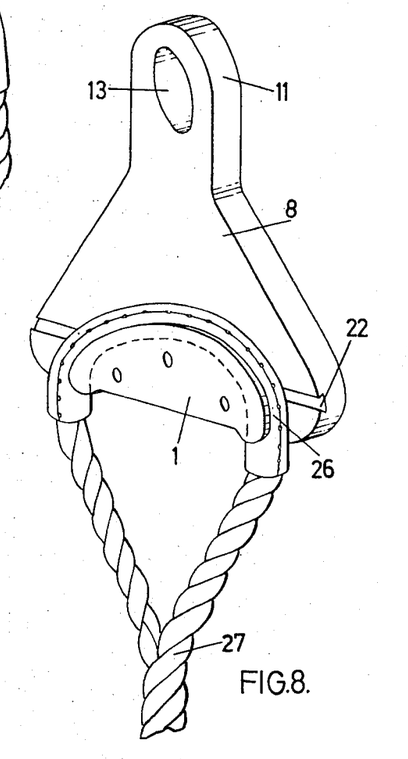
FIG. 8 shows the eye of FIG. 7, with one suspension plate attached.

To provide quick and positive attachment of the side plates 8, 9 to the saddle 1 and prevent movement of the saddle from the vertical, the suspension plates 8, 9 have horizontally disposed integral tongues 14, 15, respectively, which mate with correspondingly contoured grooves in the walls of the saddle, whilst lateral movement is prevented by one or more locking screws or bolts 16 to 19 (FIG. 3). The preferred contour for the tongues 14, 15 is dove-tailed with an inwardly inclined wall of 30° as shown in FIG. 4. The grooves and tongues can be reversed, if desired, in which case one or both plates 8, 9 will be grooved, as shown in FIG. 5.

To prevent mechanical damage to the crown of the eye splice, and to act as a stiffener between the lifting arms 10, 11, a curved guard plate 20 is inserted in and fastened to each of the suspension plates. Alternatively, as shown in FIG. 5, this may form an integral part 20 of one of the suspension plates.

The sequence of assembling these components would be to insert the tongue 21 on the right hand side of the saddle 1 into the slot 22 and slide the saddle along until the holes 23, 24 in the saddle and suspension plate 8 coincide after which the recessed locator pin 25 is inserted. The second suspension plate 9 is then offered up as shown by the arrows (FIG. 5) and slid along the tongue 15 until the holes 23, 24 and 23*a*, 24*a* coincide, whereupon the plate 9 is bolted through the saddle to the opposing suspension plate 8.

Figure 9:
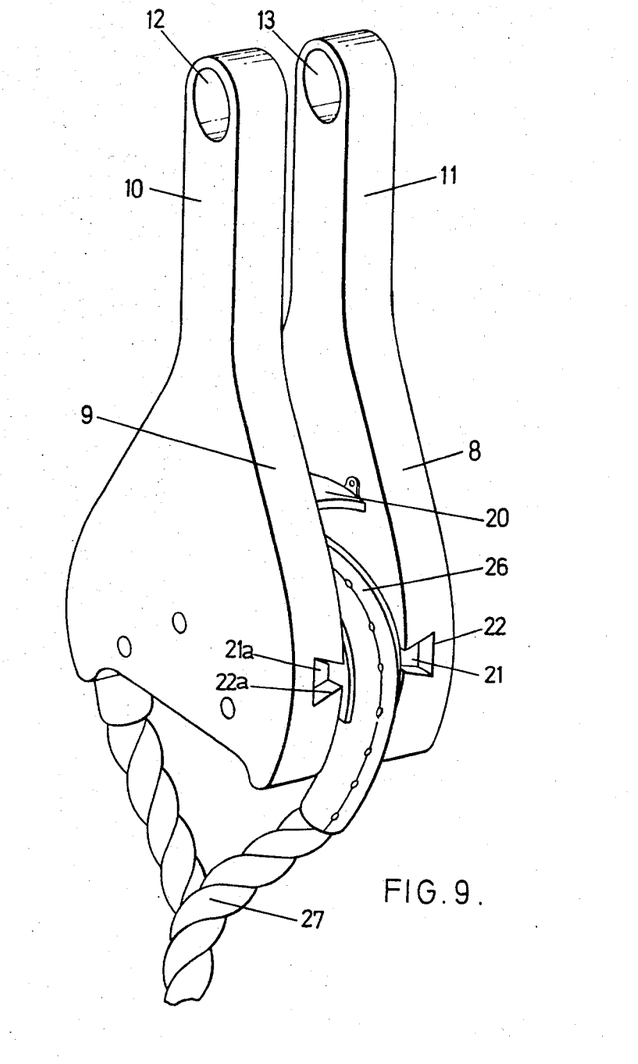
FIG. 9 is similar to FIG. 8 and shows both suspension plates attached.

The already completed soft eye splice would be positioned on the saddle 1 before the second suspension plate 9 were attached; alternatively, the device could be completely assembled and the splice made in situ. However, it is envisaged that this fitting will be employed in conjunction with sizes and overall weights of rope which would make the latter procedure impracticable, in which case the splice would be made around the saddle alone. This is illustrated in FIGS. 6 to 9: that part of a rope 25 which is destined to form the crown of the eye is sheathed with a longitudinally stitched leather sleeve 26 and, having been positioned in the peripheral groove 7, is spliced in situ at 27 (FIG. 7) to form a terminal eye. The eye and saddle are subsequently attached to the suspension plate 8 (FIG. 8) by means of a tongue and mating channel (in the manner already described), the operation being completed by attaching and securing the second suspension plate 9 in a like manner (FIG. 9).

Figure 10:
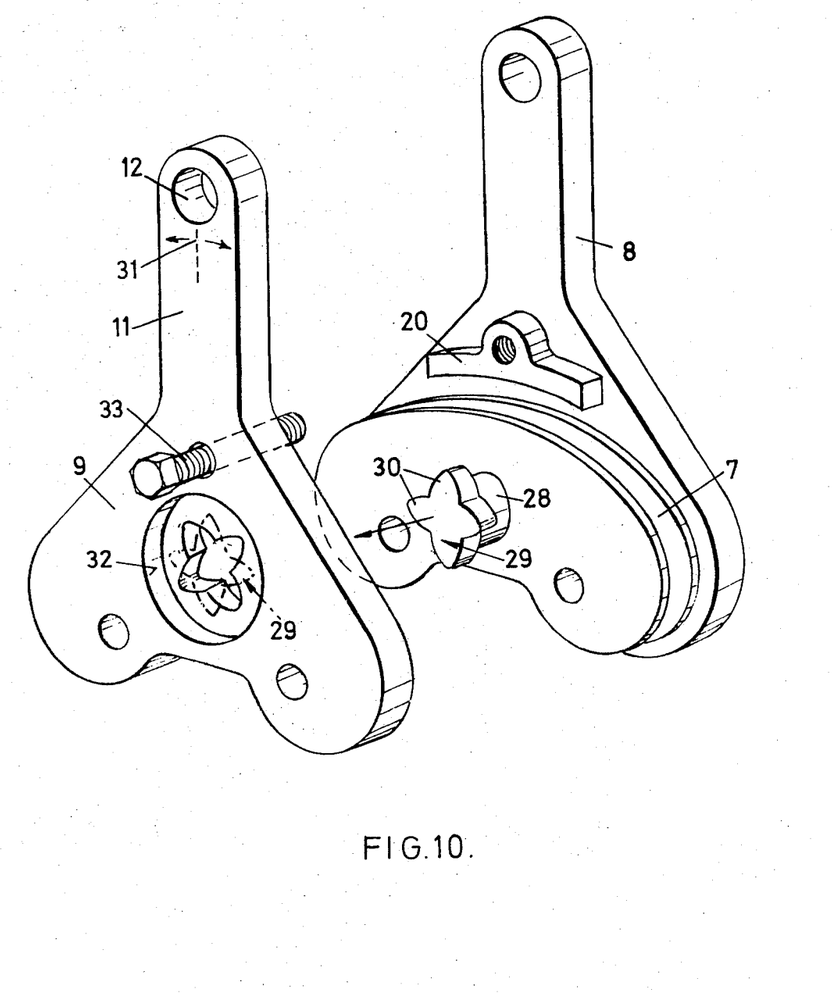
FIG. 10 is an exploded fragmentary isometric view of another fitting, in which the saddle is an integral part of one suspension plate.

In the fitting shown in FIG. 10, the saddle 1 and guard plate 20 form an integral part of the suspension plate 8, whilst the unattached wall of the saddle 1 has a centrally disposed circular spigot 28 projecting from it and terminating in a fixed head 29 having equispaced rounded projections 30. Attachment of the second suspension plate 9 is effected by presenting it to the face of the contoured head 29, sufficiently displaced laterally from its vertical axis (the displacement being shown by the arrows 31) to permit an aperture at the bottom of a recess 32 to coincide with the contour of the head, and thus allow the plate 9 to move forward onto the spigot 28 and return to its vertical position. The suspension plate 9 is maintained in this position by securing it to the guard plate 20 by a bolt 33.

Figure 11:
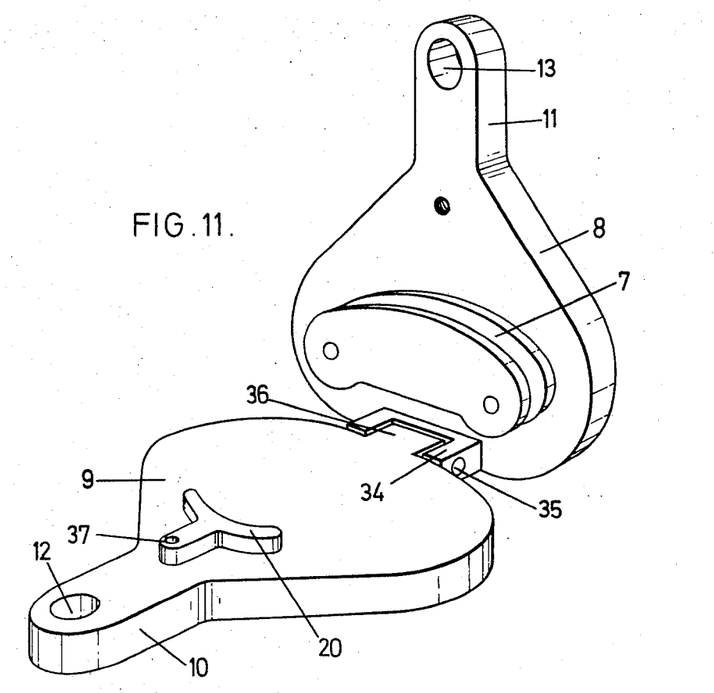
FIG. 11 is an isometric view of a further fitting, incorporating a hinge with a locking pin.

In the fitting shown in FIG. 11, the saddle 1 is either detachable from or permanently fixed to the suspension plate 8. The suspension plate 8 is hinged at 34 to the plate 9, and the hinge pin 35 may be fixed or capable of withdrawal, but preferably the latter. In this instance the eye is positioned in the groove of the saddle 1, the tongue 36 of the hinge on the suspension plate 9 is presented to the jaws of the hinge and, when aligned, the pin 35 inserted. The suspension plate 9 is then closed up to the opposing plate 8 and the whole, including the saddle, is secured by a threaded bolt (not shown) passing through a hole 37 in the guard plate 20 and suspension plate 8.

Figure 12:
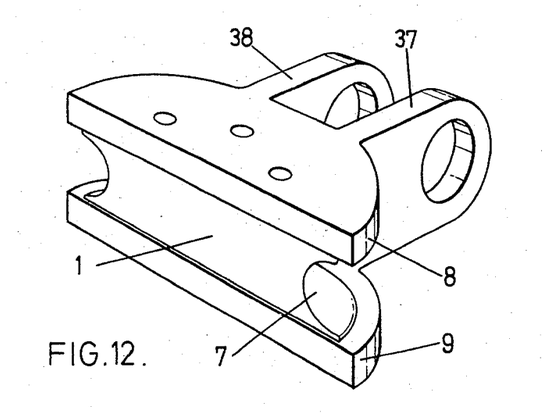
FIG. 12 is an isometric view of a fitting similar to that of FIG. 5 but with the lugs turned through an angle of 90°, and a fixed saddle.
Figure 13:
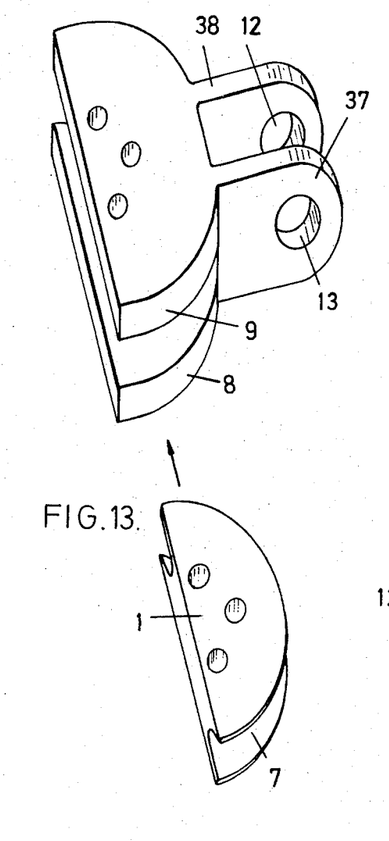
FIG. 13 is similar to FIG. 12 and shows a fitting with a removable saddle secured by bolts.

In the fitting shown in FIG. 12, the supporting arms 37, 38 lie at right angles (instead of parallel) to the supporting plates 8, 9, thereby bridging the gap between the plates, materially stiffening the fitting, and increasing its load bearing capacity, without any loss of protection to the eye splice housed within. The saddle may be permanently riveted as in FIG. 12 or detachable as in FIG. 13, in which case it is secured by recessed screw-threaded bolts.

Figure 14:
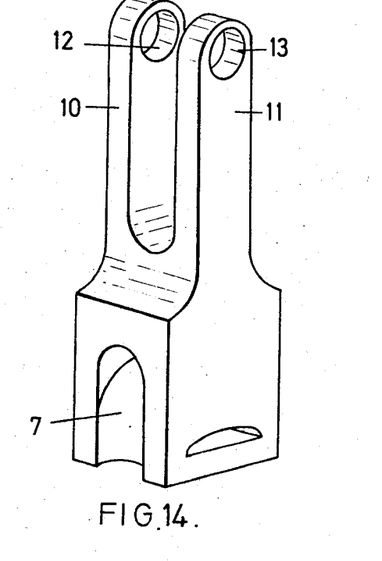
FIG. 14 is an isometric view of a further embodiment, in which the fitting is fabricated in one piece.
Figure 15:
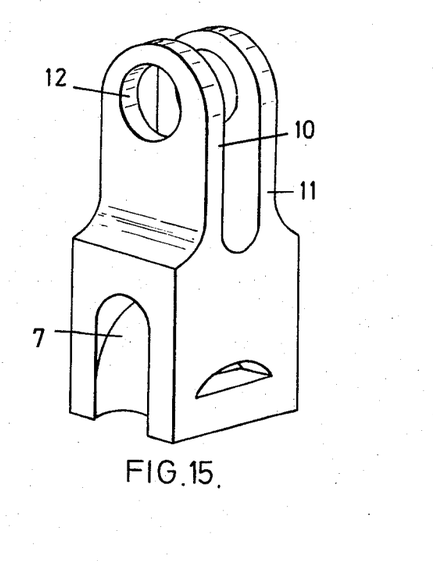
FIG. 15 is similar to FIG. 14, with the suspension lugs turned through 90°.

The fitting of FIG. 14 is in one piece, with the arms opposite and parallel to one another and to the longitudinal axis of the saddle 1. They could alternatively be opposite and parallel to one another, but at 90° to the longitudinal axis of the saddle, as in FIG. 15.

Figure 16:
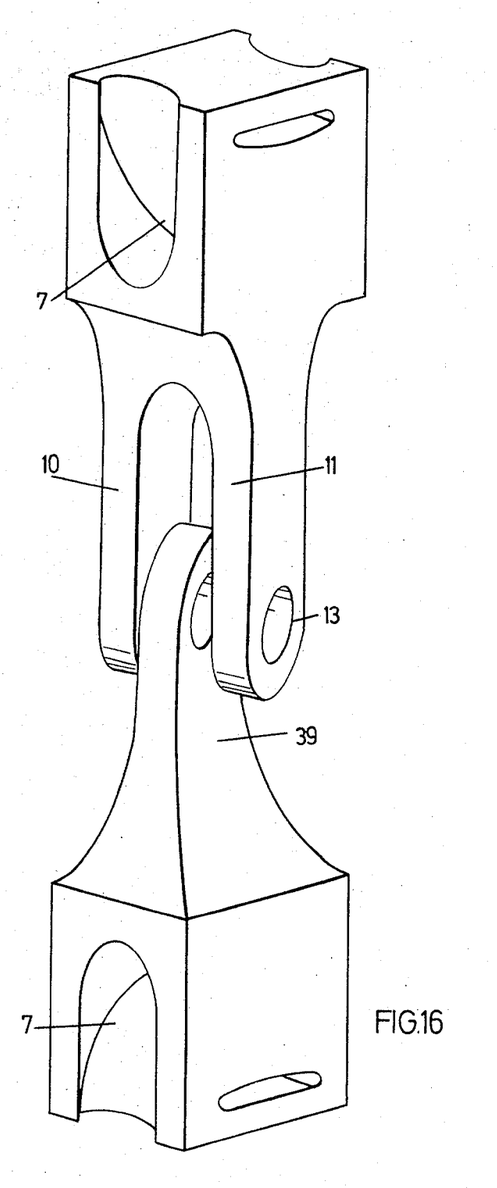
FIG. 16 is an isometric view of yet another embodiment, in which a fitting with forked lugs accepts a mating fitting which has a single lug or tongue.

FIG. 16 illustrates how, in conjunction with either of the above-described fittings, it is possible to employ a further fitting in which the body remains in the same but, in lieu of the pair of opposite and parallel arms, a single arm 39 is used. This is inserted and pinned between the arms of the fittings shown in FIGS. 14 and 15, to produce, in principle, the effect of a fork and eye coupling.

The above-described fittings utilise certain common design factors:

the diameter of the saddle 1 is not less than twice the diameter of the rope, the preferred value being 2½ times the diameter of the rope;

the distance between the flanges of the groove in the saddle 1 is not less than the full diameter of the rope plus, in the case of synthetic ropes, twice the radial thickness of the leather sheath 26;

in the case of steel ropes, the depth of the groove in the saddle 1 (the distance between the flange periphery and the base of the groove) is preferably not less than 0.55 times the rope diameter;

materials may be any ferrous or non-ferrous alloy, cermet, or plastics material, capable of sustaining the design loadings;

protection from corrosion may be provided where the materials forming the fittings do not have inherent corrosion-resistant properties.

I claim:

1. A rope fitting comprising a pair of spaced walls facing one another, and a load bearing member mounted between and rigidly interconnecting the walls, at least one of the walls being releasable from the load bearing member, the load bearing member having an arcuate groove of rounded cross-section adapted to receive the crown of an eye formed at the end of a rope, the arcuate groove running generally parallel to the walls and being unobstructedly accessible to the crown of the eye when the said at least one wall is released from the load-bearing member.

2. A rope fitting as claimed in claim 1, in which the walls are extended away from the groove and the extensions constitute attachment means.

3. A rope fitting as claimed in claim 2, in which the extensions merge into one another.

4. A rope fitting as claimed in claim 1, in which the load bearing member is connected to at least one wall by a tongue and groove.

5. A rope fitting as claimed in claim 1, in which the load bearing member has a generally semicircular profile when viewed from one wall towards the other.

6. A rope fitting as claimed in claim 1, further comprising a curved guard plate mounted between the walls over the arcuate groove.

* * * * *